March 28, 1967          R. J. HOLTON          3,311,399

FASTENING DEVICE AND HANDLE ASSEMBLY

Filed Feb. 24, 1965          3 Sheets-Sheet 1

*INVENTOR.*
ROBERT J. HOLTON
BY Teare, Fetzer & Teare
ATTORNEYS

March 28, 1967 R. J. HOLTON 3,311,399
FASTENING DEVICE AND HANDLE ASSEMBLY
Filed Feb. 24, 1965 3 Sheets-Sheet 2

INVENTOR.
ROBERT J. HOLTON
BY Teare, Fetzer & Teare
ATTOREYS

March 28, 1967  R. J. HOLTON  3,311,399
FASTENING DEVICE AND HANDLE ASSEMBLY
Filed Feb. 24, 1965  3 Sheets-Sheet 3
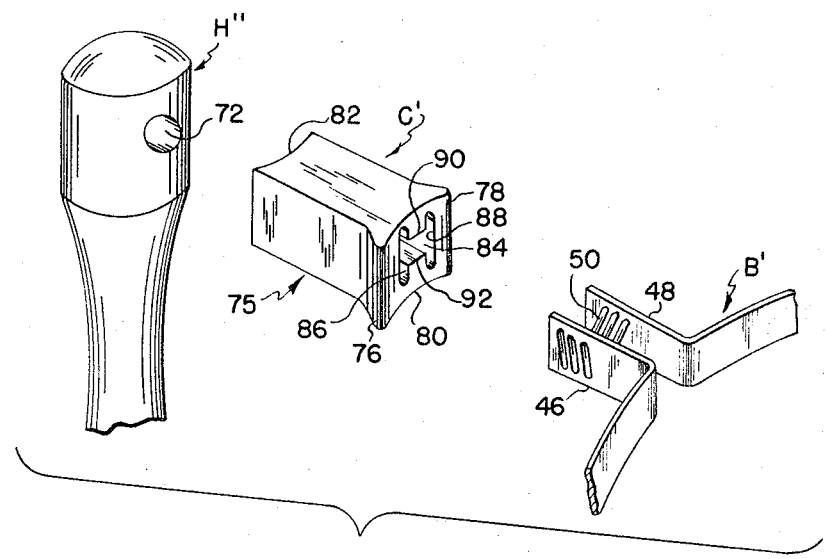
FIG.13
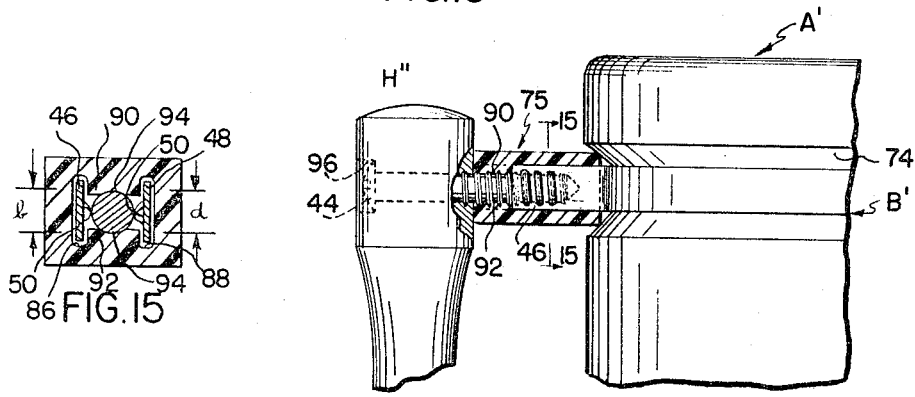
FIG.14
FIG.15
INVENTOR.
ROBERT J. HOLTON
BY
Teare, Fetzer & Teare
ATTORNEYS

United States Patent Office 3,311,399
Patented Mar. 28, 1967

3,311,399
FASTENING DEVICE AND HANDLE
ASSEMBLY
Robert J. Holton, Rocky River, Ohio, assignor to Tinnerman Products, Inc., a corporation of Ohio
Filed Feb. 24, 1965, Ser. No. 434,872
8 Claims. (Cl. 294—31.2)

This invention relates to fastening means, and more particularly relates to an improved fastening device and handle assembly for mounting a vessel, such as a glass-ware utensil or the like.

In the past various types of handle arrangements have been proposed for clamping a handle carrying band on a vessel, such as a glass utensil. In such arrangements, the attachment between the handle and the band was heretofore accomplished by insertion of the free end portions of the band into a socket provided in the handle. Moreover, in such arrangements the connection between the handle and the band was achieved solely by and was dependent upon the spring characteristics of the band material. Though being of simple construction, such arrangements easily loosen in normal handling of the vessel, particularly where there exists any tolerance variation between the parts which results in damage or actual destruction to the vessel during use. Furthermore, it has been found that such arrangements do not provide a strong or rigid support for the vessel, particularly when the vessels of large volumetric capacity are employed.

Accordingly, an object of the present invention is to provide an improved construction for a handle and band assembly which includes a flexible band which can be quickly and easily applied in clamping relationship around the vessel for rigid attachment of the handle thereto.

Another object of the present invention is to provide a fastening clip for cooperative use with the assembly of the character described which is of simple and economical construction for mounting the assembly in rigid supported and positive clamped relationship on the vessel.

A further object of the present invention is to provide a fastening clip of the character described which is readily adapted to receive the free ends of the band in one end and a threaded member through the other end for connecting the handle to the band, and for automatically drawing the band in tight clamping relatioship around the vessel upon turning movement of the screw through the clip.

A further object of the present invention is to provide a fastening clip of the character described which is comprised of a polymeric material and which includes ribbed means constructed and arranged interiorly thereof for precise self-threaded engagement thereon upon turning movement of the threaded member in the clip.

A still further object of the present invention is to provide a fastening clip of the character described for use with a handle and band assembly of the type including a flexible band having free end portions adapted to be disposed around a vessel, and a handle having a threaded member disposed for movement therethrough, the clip including an elongated body comprised of polymeric material, the body having a slot extending axially therethrough and defined by a pair of spaced, oppositely disposed channels adapted to spaced, oppositely disposed ribs extending intermediate the channels, and the ribs being spaced apart by an amount sufficient to provide self-thread cutting action thereon upon turning movement of the threaded member through the slot provided in the clips.

Other objects and advantages of the invention will be apparent from the following description taken in conjunction with the accompanying drawing wherein:

FIG. 13 is a fragmentary exploded assembly view showing another modification of the handle and band assembly made in accordance with the present ivention;

FIG. 14 is a fragmentary side elevational view showing the handle and band assembly of FIG. 13 mounted on a vessel of the general type shown in FIG. 7; and FIG. 15 is an enlarged vertical section view taken along the plane of line 15—15 of FIG. 14.

Figure 1:
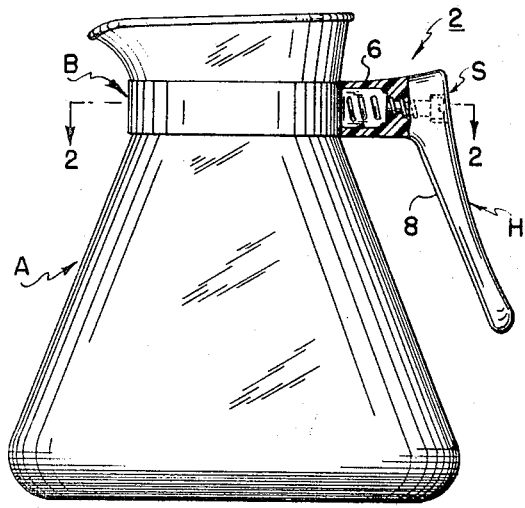
FIG. 1 is a side elevational view partially in section and showing the attachment of the handle and band assembly of the present invention to a vessel, such as a glass-ware utensil.
Figure 3:
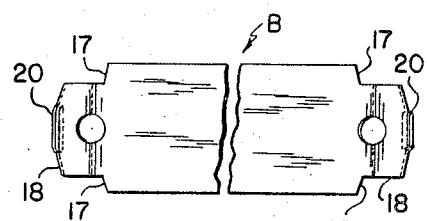
FIG. 3 is an enlarged broken top plan view of the flexible band removed from and prior to assembly with the vessel of FIG. 1.
Figure 4:
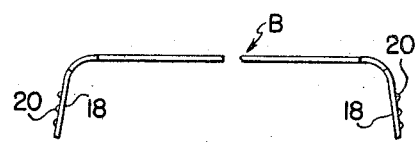
FIG. 4 is a side elevational view of the flexible band shown in FIG. 3.

Referring to the drawings and in particular to FIGS. 1 to 6 thereof, there is shown one form of the handle assembly of the invention, designated generally at 2, for detachable connection to a vessel A, such as a glass-ware utensil or the like. The assembly includes a handle H which may be mounted on the vessel A by means of a flexible clamp or band B which is adapted to be disposed around the reduced neck portion 4 of the vessel. In order to detachably connect the handle H to the band B and tighten the latter in gripping engagement around the vessel A, a threaded member S may be inserted through the handle and into coacting threaded engagement with the free ends of the band B, as will be hereinafter more fully described.

Figure 2:
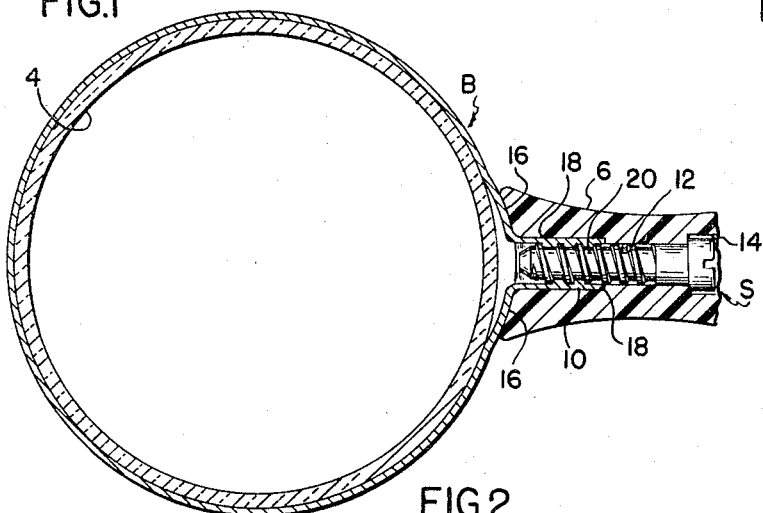
FIG. 2 is a longitudinal cross-sectional view taken along the plane of the line 2—2 of FIG. 1.
Figure 5:
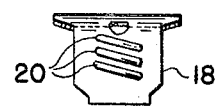
FIG. 5 is an enlarged fragmentary view showing, in end elevation, one of the free end portions of the flexible band shown in FIG. 4.

As best shown in FIGS. 1 and 2, the handle H may be of any suitable shape, such as the modernistic generally L-shape illustrated, including a base portion 6 and a handgripping portion 8. The base portion 6 includes a generally polygonal, such as rectangular, entrance slot 10 extending from one end thereof. The entrance slot 10 is preferably of a height and width to suitably accommodate the free ends of the band B when inserted therein. An axial bore 12 of reduced diameter communicates with and extends from the entrance slot 10 and terminates in an enlarged counter-sunk slot 14 for receiving and seating the threaded member therein. The base portion 6 adjacent the entrance slot 10 is preferably provided with generally arcuate end surfaces 16 for uniform, tight fitting engagement against the confronting outer surface of the reduced neck portion 4 of the vessel A.

In this form and prior to assembly, the band B is of a generally flat configuration, in elevation, and is comprised of material having a spring-like nature, such as spring steel or aluminum. The opposite ends of the band are struck-out, as at 17, and bent downwardly to provide resilient tongues 18 which are of a reduced transverse dimension compared to the transverse dimension of the band itself for facile insertion into the entrance slot 10 of the handle H. Each tongue 18 is preferably provided with a plurality of serrations 20 made by suitable forming operations, as are known in the art. The serrations 20 are preferably helically inclined and disposed in axially spaced relationship (FIG. 5) for coacting threaded engagement with the threaded member S. Though three serrations have been shown on each tongue, the number of serrations may vary in each case dependent upon the desired engagement with the threaded member S. Similarly, the band B may be of any suitable length dependent on the particular size vessel to which it is to be applied.

Figure 6:
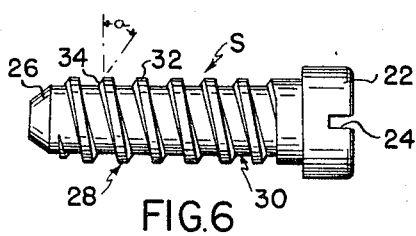
FIG. 6 is an enlarged side elevational view showing one of the threaded members made in accordance with the present invention.
Figure 7:
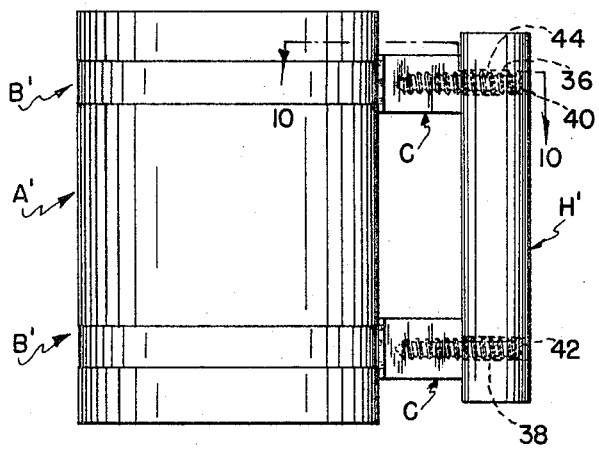
FIG. 7 is a side elevational view of a modification of the handle and band assembly of the present invention, and showing the assembly mounted on a vessel, such as a glass-ware mug.

In accordance with this form of the invention, the threaded member S is generally of a worm-like screw construction comprised preferably of a polymeric material, such as plastic or the like. The screw, in the embodiment shown, includes an enlarged head portion 22 at one end having a slot 24 for engagement by a suitable tool, such as a screw driver, and is provided at its opposite end with a generally conical nose portion 26. As shown in FIG. 6, the screw includes a plurality of integral, generally helical convolutions 28 spaced longitudinally from one another by means of grooves 30. The outer peripheral surface of the convolutions 28 is preferably flat or planar, as at 32, to provide a large area of contact for surface-to-surface engagement with the material of the band B intermediate the band serrations 20. This area provides integral means on the screw to maximize the threaded strength characteristics upon engagement with the free ends of the band B and effectively to prevent longitudinal displacement of the screw upon application of stress and/or strain forces incident to normal use of the vessel.

The leading side edges 34 of the convolutions 28 are preferably inclined in a direction away from the nose portion 26 so as to be disposed in undercut relationship (FIG. 2) with the spaced serrations 20 provided on the band B upon turning movement of the screw S. It is preferred that the included angle ($a$) between for instance the side edge 34 and a vertical plane passing through and disposed normal to the longitudinal central axis of the screw S be about 10°. This relationship facilitates free turning movement of the screw about its longitudinal axis and provides smooth, uniform threading engagement with the serrations 20 on the band B.

In assembly, the band B is disposed circumferentially around the reduced neck portion 4 of the vessel A and the free ends or tongues 18 brought together by the application of slight pressure applied thereto. Thus positioned, the tongues 18 may then be inserted into the entrance slot 10 in the handle H, whereupon, under the influence of residual spring pressure, the tongues 18 snap outwardly away from one another and into engagement with the confronting interior side surfaces of the slot 10. In this temporary engaged position, the screw S may then be inserted through the axial bore 14 and into threaded coacting engagement between the spaced tongues 18 of the band B. Upon turning of the screw S, the helical convolutions 28 move progressively forward between adjacent serrations 20 of the band which causes the tongues 18 to diverge outwardly into tight engagement with the confronting interior surfaces of the slot 10. Turning movement of the screw S is continued until the head 22 thereof is seated within the counter-sunk slot 14, whereupon, an axial "pulling" force is caused to be exerted upon the tongues 18 so as to draw the band B into tight clamping relationship about the vessel A. To remove the handle H, the screw is simply backed-off in the opposite direction until it is disengaged from the spaced serrations 20 of the tongues 18, whereupon, the handle may be readily disassembled from the band.

In FIGS. 7 to 12 there is illustrated a modification of the invention wherein a pair of laterally spaced flexible bands B' may be utilized for detachably mounting a handle H' on a vessel A', such as a glass-ware mug or the like, by means of a pair of interconnecting fastening clips C.

In this form, the handle H' is shown as being of an elongated, generally cylindrical construction which may be made of any suitable material, such as metal, wood, plastic or the like. The handle includes a pair of laterally spaced, transverse bores 36 and 38 which extend therethrough and which communicate with countersunk slots 40 and 42 opening onto one side thereof. The bores and counter-sunk slots are adapted to receive and seat therein a suitable headed fastener 44, such as conventional-type sheet metal screw, for detachably connecting the handle H' to the respective bands B', as will hereafter be more fully described.

Figure 10:
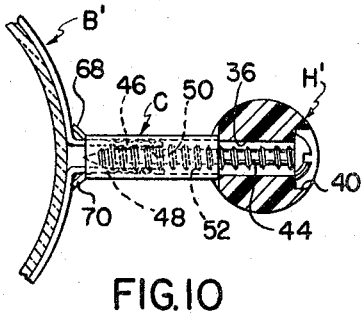
FIG. 10 is an enlarged fragmentary cross-sectional view taken along the plane of line 10–10 of FIG. 7.
Figure 8:
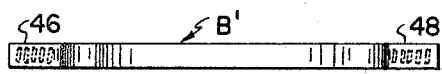
FIG. 8 is a top plan view showing the inner or under side of another form of the flexible band of the present invention for use in the assembly of FIG. 7.
Figure 9:
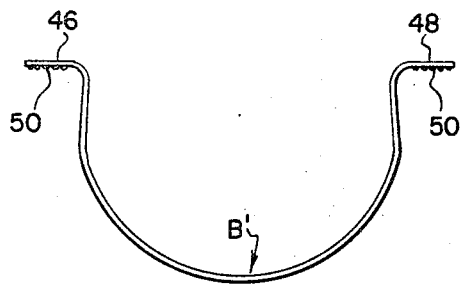
FIG. 9 is a side elevational view of the flexible band shown in FIG. 8.

The flexible bands B' are of identical construction, each of which is generally semi-circular in shape prior to assemble on the vessel A' and comprised of a spring-like material, as aforesaid. Each band is bent outwardly adjacent its free ends to provide a pair of laterally spaced, resilient tongues 46 and 48 which are provided with a plurality of serrations 50. Here again, the serrations 50 are laterally spaced and angularly inclined to correspond with the general helical threads 52 on the fastener 44, as shown in FIG. 10.

Figure 12:
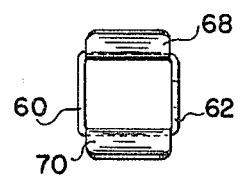
FIG. 12 is an end elevational view looking from the left hand side of FIG. 11.

In accordance with this form of the invention, each fastening clip C provides a socket for threaded engagement of the screw 44 with the resilient tongues 46 and 48 of the associated flexible band B'. The clips C are of identical construction made from a single blank of strip of rigid material, such as sheet metal, plastic or the like. The strip may be bent, into a generally box-like housing 54 which is open at both ends thereof. As shown in FIG. 12, the housing 54 is generally polygonal, such as rectangular shaped, in end elevation. The housing 54 includes oppositely disposed top 60 and bottom walls 62 integrally connected to oppositely disposed generally vertical side walls 56 and 58 which together define the polygonal configuration illustrated. The housing 54 is preferably of a height and width sufficient to slightably, yet snugly accommodate therein the tongues 46 and 48 of the band B' when inserted therein.

Figure 11:
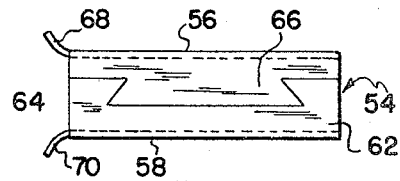
FIG. 11 is an enlarged bottom view of one form of the fastening clip made in accordance with the present invention and removed from the assembly of FIG. 7.

As shown in FIG. 11, the side wall 62 of the housing 54 may be severed or split longitudinally to provide a key-like slot 64 and a correspondingly shaped key portion 66 which are disposed for interlocking relationship with one another to provide a unitary housing structure. The material of the side walls 56 and 58 is preferably struck-out and bent outwardly to provide a pair of angularly outwardly disposed, generally arcuate flanges 68 and 70 which are contoured for abutment against the confronting surfaces of the flexible band B' in the area adjacent the juncture with the resilient tongues 46 and 48. This arrangement facilitates insertion of the resilient tongues 46 and 48 into the housing 54 and substantially strengthens and rigidifies the interlocking connection of the clip and associated with one of the flexible bands.

In assembly, the flexible bands B' may be disposed circumferentially around the vessel A' and in laterally spaced relationship with one another. The resilient tongues 46 and 48 may be brought together in more or less of a laterally spaced relationship by the application of slight pressure applied thereto. The fastening clips C may then be inserted onto the resilient tongues 46 and 48 so that the flanges 68 and 70 are disposed in abutting engagement with the confronting surfaces of the respective bands. Thus positioned, the screws 44 may then be inserted through the bores 36 and 38 in the handle H' and the latter attached to the respective bands by turning screws 44 into threaded engagement between the resilient tongues 46 and 48 disposed within the respective clips C. As the screws 44 engage and threadably coact with the serrations 50, the tongues 46 and 48 are biased outwardly into tight fitting engagement against the confronting interior surfaces of the housing 54. Turning movement of the screws may be continued until they are seated within the countersunk slots 40 and 42 of the handle H', whereupon, the respective bands B' are drawn into tight clamping engagement around the vessel A'.

In some instances, it may be desirable to pre-assemble the handle H' with the respective bands B' and then mount the same as a unit on the vessel A'. In such case, the screws S' may simply be backed-off by an amount sufficient to enable the bands B' to fit over the top of the vessel and into circumferentially disposed relationship therewith. Thus positioned, the bands may then be drawn into tight fitting clamped relationship around the vessel, as aforesaid.

The fastening clips C provide many advantages for detachably mounting a handle on a vessel. Moreover, the clips act as a permanent support for and provide a precise threading of the screws 44 during installation thereof. Furthermore, the clips act as a spacer in mounting the handle on the vessel and provide optimum strength characteristics for retaining the parts in assembled relationship during normal handling of the vessel.

In FIGS. 13 to 15, there is illustrated another modification of the invention which is generally similar to that shown in FIGS. 7 to 12 for detachably mounting to a handle H'' on a vessel A' such as a glass-ware mug, by means of a pair of flexible bands B' and interconnecting fastening clips C'. In this form, only one of the band and clip arrangements are shown for purposes of illustration.

In the embodiment shown, the handle H'' may similarly be provided with transverse bores 72 (one shown) which are adapted to receive therethrough the aforementioned type of conventional sheet metal screw 44. The screws are similarly adapted to be inserted through the fastening clips C' and into coacting threaded engagement with serrations 50 on the resilient tongues 46 and 48 of the respective band. In this case, the vessel A' may be provided with an annular recessed groove 74 (one shown) to accommodate and prevent lateral shifting movement of the associated band B' during normal use of the vessel.

The fastening clips C' in the embodiment shown are preferably comprised of a polymeric material, such as plastic or the like, which may be made into one or two piece construction by suitable forming operations, such as molding or extrusion, as known in the art. Each clip C' is preferably of a unitary, one-piece construction and includes a main body 75 having a suitable exterior shape, such as the generally polygonal shape, illustrated, having side portions 76 and 78 which curve divergently outwardly from one another adjacent one end thereof. The inner 80 and outer 82 opposed ends of the body 75 are preferably arcuate in contour so as to be in conformity with the corresponding confronting surfaces presented by the flexible band B' and handle H'', respectively.

The body 75 of the clip is preferably provided with a generally H-shaped slot 84 which extends axially through and which opens onto the opposed ends of the body. The slot 84 is defined by a pair of oppositely disposed, parallel channels 86 and 88 and a pair of oppositely disposed, parallel ribs 90 and 92. The channels 86 and 88 are preferably of a height and width to slightably, yet snugly accommodate therein the resilient tongues 46 and 48 of the associated band when inserted therein. The ribs 90 and 92 are preferably spaced apart by a distance $(b)$ which is slightly less than the pitch diameter $(d)$ of the associated screw 44 which is adapted to be inserted through the slot 84. Moreover, an important advantage of this construction resides in the fact that the screw S' is enabled to actually cut or dig into the material of the ribs 90 and 92, as at 94, (FIG. 15) upon turning movement of the same through the clip C. By this arrangement, the screw, in effect, cuts its own threads interiorly of the body 75 of the clip prior to being threaded into coacting engagement with the serrations 50 on the resilient tongues of the band. Accordingly, in assembly the flexible bands B' are disposed in circumferential relation within the grooves of the vessel A' and the resilient tongues 46 and 48 brought together by the application of slight pressure applied thereto. The tongues 46 and 48 may then be inserted into the spaced channels 86 and 88 provided in the body 75 of the respective clip. Thus positioned, the screws 44 may then be inserted through the bores 72 in the handle H'' and turned into thread cutting engagement with the spaced ribs 90 and 92 within the slots 84 of the associated clips. Turning movement of the screws 44 is continued until they are brought into threadable coacting engagement with the serrations 50 on the respective resilient tongues 46 and 48, whereupon, the latter are biased outwardly away from one another and into tight fitting engagement against the confronting interior surfaces of the side walls of the associated clips. As the screws are turned into seated engagement within the counter-sunk slots 96 in the handle, the flexible bands B' are drawn into tight clamped relationship about the vessel.

Moreover, it can be seen that several important advantages are derived from use of the fastening clips shown in FIGS. 13 to 15. More specifically, the spaced channels and ribs coact together as a separator during insertion of the resilient tongues therein to provide an easier and more precise threadable coacting engagement on the serrations of the tongue by the screws. In addition, the predetermined laterally spaced relationship of the ribs provides an effect, locking effect, on the threads of the screws to prevent axial displacement of the latter in the holding the parts in assembled relationship.

The terms and expressions which have been used are terms of description and not of limitation, and there is no intention in the use of such terms and expressions of excluding any equivalents of the features shown or described, or portions thereof, but it is recognized that various modifications are possible within the scope of the invention claimed.

I claim:

1. In a handle assembly comprising, at least one flexible band having free end portions adapted to be disposed around a vessel or the like, a fastening clip attached at one end to the free end portions of said band, a handle having a threaded member disposed therethrough and extending into the other end of said clip, said threaded member being movable in said clip for coacting threaded engagement with the free end portions of said band, said clip including a body comprised of polymeric material, such as plastic or the like, said body having a slot extending axially therethrough and including a pair of spaced, oppositely disposed ribs within said slot, said threaded member being movable within said slot for self-thread cutting engagement with said ribs.

2. In a handle assembly according to claim 1, wherein the slot is of a generally H-shape configuration, in end elevation, defined by a pair of spaced, oppositely disposed channels, said channels being located on either side of said ribs for receiving the free end portions of said band therein.

3. In a handle and band assembly for mounting on a vessel or the like comprising, at least one flexible band having free end portions adapted to be disposed around said vessel, the free end portions of said band including generally resilient tongues having threaded means thereon, a fastening clip comprised of polymeric material having an axial slot attached at one end to the tongues of said band, said clip including a pair of spaced, oppositely disposed ribs extending interiorly of said slot and intermediate said tongues, a handle having a transverse bore disposed adjacent the slot in said clip, a threaded member disposed through said bore and extending between said tongues and ribs within said clip, said threaded member being movable within said slot for self-thread cutting engagement on said ribs and for coacting threaded engagement on the threaded means of said tongues for clamping the band around said vessel.

4. A fastening clip for mounting a handle and band assembly on a vessel or the like, said clip including an elongated body comprised of polymeric material or the like, said body having a generally H-shaped slot extending axially therethrough and defined by a pair of spaced, oppositely disposed channels and a pair of spaced, oppositely disposed ribs extending intermediate said channels, said ribs being spaced apart by an amount sufficient to provide self-thread cutting action thereon upon turning movement of a threaded member in said slot.

5. A fastening clip in accordance with claim 4, wherein the distance between said ribs is slightly less than the pitch diameter of said threaded member.

6. A fastening clip in accordance with claim 4, wherein the opposed ends of said body are of a generally arcuate shape for uniform, tight fitting engagement with the respective band and handle of said assembly.

7. A fastening clip for use with a handle and band assembly of the type including a flexible band having free end portions adapted to be disposed around a vessel, and a handle having a threaded member disposed for movement therethrough, said clip including an elongated body comprised of polymeric material, said body having a generally H-shaped slot extending axially therethrough and defined by a pair of spaced, oppositely disposed channels adapted to receive the free end portions of said band therein, and a pair of spaced, oppositely disposed ribs extending intermediate said channels, said ribs being spaced apart by an amount sufficient to provide self-thread cutting action thereon upon turning movement of said threaded member in said slot.

8. In a handle assembly comprising, at least one flexible band having free end portions adapted to be disposed around a vessel or the like, the free end portions of said band including generally resilient tongues having threaded means thereon, an elongated, generally hollow fastening clip attached at one end to the tongues of said band, a handle having a bore disposed adjacent the other end of said clip, a threaded member disposed through said bore and extending between the tongues of said band within said clip, said threaded member being movable within said clip for coacting threaded engagement with the threaded means on said tongues for clamping the band around said vessel, said clip including a generally polygonal, in end elevation, metal casing open at both ends thereof and defined by top, bottom and a pair of interconnecting side walls, said side walls each including an angularly outwardly extending resilient flange portion for tight fitting engagement with the confronting surfaces of said band, one of said side walls being severed longitudinally and defining a key-like slot and a correspondingly shaped key portion disposed in said slot to provide lateral expansion of the respective side walls upon turning movement of said threaded member through said casing and into threaded coacting engagement with the threaded means on said tongues.

References Cited by the Examiner

UNITED STATES PATENTS

| 2,150,080 | 3/1939 | Rawlings. |
| 2,545,514 | 3/1951 | Erb. |
| 2,686,072 | 8/1954 | Guilder _ _ _ _ _ _ _ _ _ _ _ _ 294—31.2 |
| 2,890,845 | 6/1959 | Kiekhaefer. |

GERALD M. FORLENZA, *Primary Examiner.*

G. F. ABRAHAM, *Assistant Examiner.*